United States Patent [19]

Pritchard

[11] 4,150,395

[45] Apr. 17, 1979

[54] TIME BASE ERROR CORRECTION SYSTEM

[75] Inventor: Dalton H. Pritchard, Princeton, N.J.

[73] Assignee: RCA Corporation, New York, N.Y.

[21] Appl. No.: 836,509

[22] Filed: Sep. 26, 1977

[51] Int. Cl.² .................... H04N 9/02; H04N 5/79
[52] U.S. Cl. ......................................... 358/8; 360/36
[58] Field of Search ................. 358/8, 149; 360/36; 331/17, 20, 25, 10

[56] References Cited

U.S. PATENT DOCUMENTS

| | | | |
|---|---|---|---|
| 3,711,641 | 1/1973 | Palmer | 360/36 |
| 3,911,476 | 10/1975 | Keizer | 358/4 |
| 3,931,638 | 1/1976 | Lentz | 360/36 |
| 3,959,815 | 5/1976 | Rotter et al. | 360/36 |
| 3,984,867 | 10/1976 | Harnandez | 360/36 |
| 3,996,606 | 12/1976 | Pritchard | 358/8 |
| 4,005,476 | 1/1977 | Dickopp et al. | 360/36 |

OTHER PUBLICATIONS

Microtime Company Product, Re. 640 Digital Time Base Corrector.
Coleman, "A New Technique for Time-Base Stabilization of Video Recorders", *IEEE Trans. on Broadcasting*, Mar. 1971, pp. 29–36.

*Primary Examiner*—John C. Martin
*Attorney, Agent, or Firm*—E. M. Whitacre; W. H. Meagher; J. S. Tripoli

[57] ABSTRACT

Means are provided for detecting departures of the relative velocity between a signal pickup and the information track of a video disc from a predetermined value. Signals recovered when relative motion is established between the track of the disc and the signal pickup are subjected to a delay in a charge transfer delay line. The line delay is made to vary in response to the output of the detecting means so as to compensate for signal time base errors engendered through departures of said relative velocity from the predetermined value. Non-linearities of the time delay of the delay line with respect to the output of the detecting means, which are due to large changes in the output frequency of a voltage controlled oscillator utilized for controlling the operation of the delay line, are compensated for by means of a linearizing feedback loop for the oscillator.

10 Claims, 1 Drawing Figure

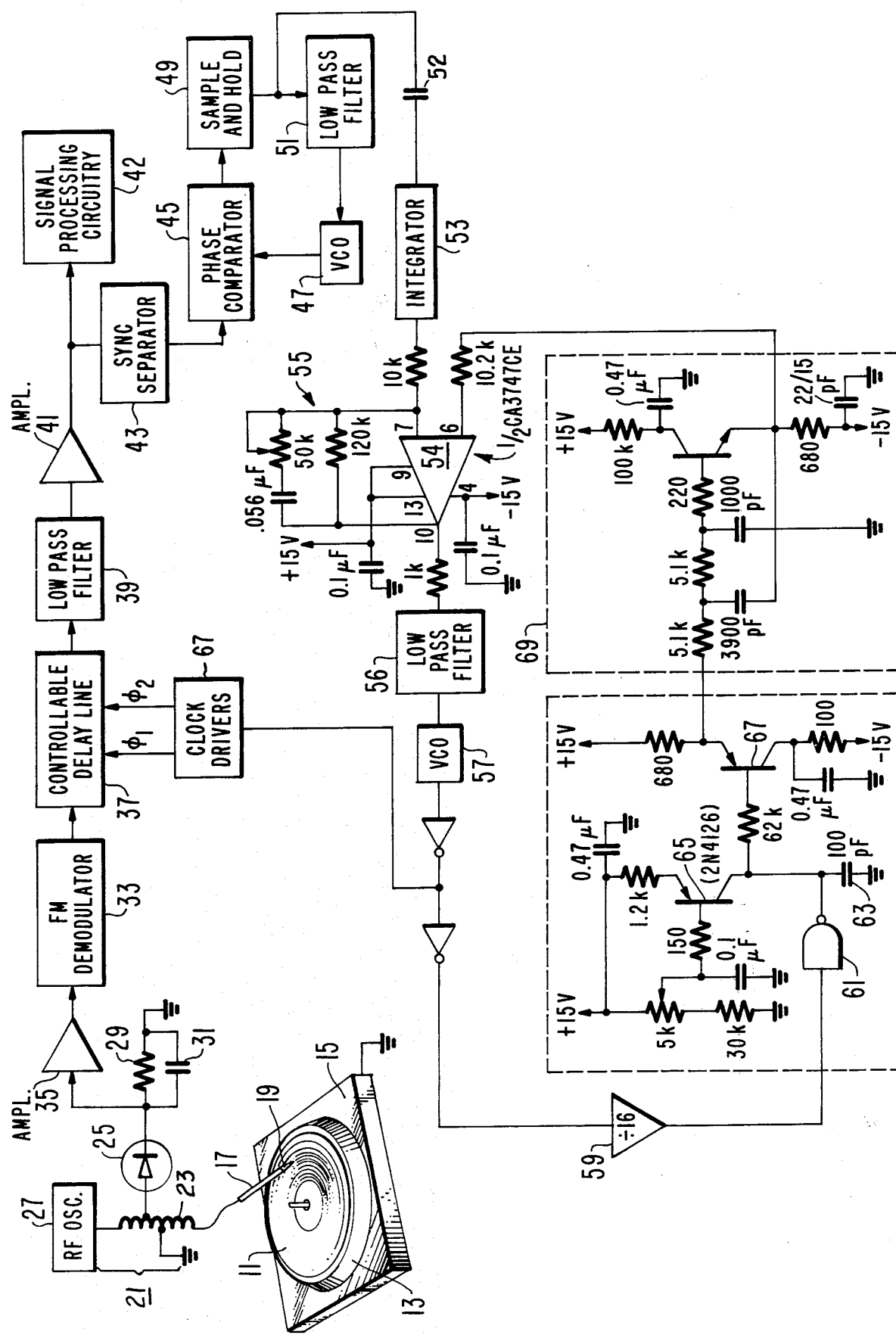

TIME BASE ERROR CORRECTION SYSTEM

The present invention relates in general to signal processing circuitry for video disc record players, and more particularly, to signal processing circuitry for compensating signals recovered during playback of an information record for time base errors engendered through departures of the relative velocity between a signal pickup and the information track of the record from a predetermined value.

When video signals are recorded on a disc and replayed using a substantially constant speed turntable and signal pickup assembly similar to a phonograph player mechanism (e.g., of a type described in U.S. Pat. No. 3,842,194 — Clemens), it is necessary to maintain the rotational velocity of the disc relatively constant to prevent "jitter" of the conventionally displayed (e.g., by means of a commercial receiver) television picture. This picture "jitter" results from departures in the relative velocity established between the information track of the disc and the signal pickup from a given value (hereinafter referred to as relative velocity errors). In addition to picture jitter, if color television signals are being played back, small relative velocity errors will also noticeably deteriorate the quality of the color display.

Velocity errors result from several sources. For example, disc mounting eccentricities, disc warp, disc pressing distortions, recording errors, turntable eccentricities or turntable drive motor shaft and idler assembly eccentricities, or vibrations. Although precise mechanical design and manufacture of the disc and turntable mechanism can minimize the relative velocity errors due to these sources, residual velocity errors sufficient to deteriorate the picture quality will remain.

In audio playback systems, the turntable speed is relatively slow and the signal frequency of the recovered information is low compared to the signal frequency of the recovered video information. Thus, speed variations (wow and flutter) present in audio playback systems can be adequately reduced by the design of the turntable mechanism, and residual relative velocity errors of 0.5 percent or less are unnoticeable. With video recording, however, a very small velocity error (i.e., 0.01 percent) will noticeably affect picture quality. A turntable cannot be economically designed for mass consumer use which will provide sufficient rotational speed accuracy to prevent distortion in the image reproduced on a conventional receiver from signals derived from a video record. In addition, the video record itself cannot be inexpensively manufactured to the tolerances necessary to prevent the occurrence of relative velocity errors less than 0.5 percent between the record and the signal pickup. The remaining relative velocity errors, lying in a range defined between 0.01 and 0.5 percent are of a sufficient magnitude to cause the aforesaid picture jitter and color phase distortion of the reproduced image even if the turntable speed was held constant.

Illustratively, in a video disc player system of the aforementioned Clemens type, the frequency of these relative velocity errors lie in a range from a very low frequency (such as 6 Hz) to approximately 1 KHz, and the effect thereof on the signal recovered during disc playback is the severe alternate compression and stretching of those signals (i.e., change of instantaneous frequency). For example, where the information recovered from the disc record comprises a succession of (1H) video lines, the alternate stretching and compression of those lines will result in some of those video lines having time durations lying within a range of values from up to values 50 percent greater than to down to values 50 percent less than 1H and therefore, signal frequencies contained within these video lines are altered from the intended values.

In one approach (described in U.S. Pat. No. 3,711,641 — Palmer) to the time base stabilization of signals recovered from a disc record, circuit means are provided for detecting the relative velocity errors. The circuit means provide a corrective error signal which is processed and applied to an electromechanical transducer to which a signal pickup carrying arm is mounted. The transducer imparts a corrective longitudinal motion to the arm to maintain the relative velocity between the signal pickup and the information track of the record at a predetermined value.

While the aforementioned electro-mechanical approach to time base stabilization is satisfactory in effecting the large corrections required when signals are recovered from a disc record, it is desirable to effect such corrections without resort to electro-mechanical means. By effecting such corrections electronically, player manufacturing is simplified and the diminution in the number of moving parts enhances player ruggedness.

Charge transfer devices providing a variable delay line have been proposed, in the prior art, as a means for signal time base stabilization. Such systems are customarily operated to provide small delay swings (e.g., a range between a maximum and minimum delay value of approximately 12.7 $\mu$sec.).

Operating difficulties which occur in signal processing using a variable frequency clock with a charge transfer delay line relate to the limits imposed by the Nyquist sampling theorem. This familiar theorem states that the highest frequency that can be passed, and still preserve amplitude information, by any coupled system is one-half the sample rate. Furthermore, for good order of accuracy the sample rate should be at least three times the highest frequency whose phase relationship must be maintained. Therefore, passage through any coupled system for a color video signal conforming to the illustrative NTSC standard, dictates that the sampling rate be at least 10.74 MHz (i.e., 3×3.58 MHz) to preserve the amplitude information and phase relationship of the color subcarrier burst. While the minimum effective sampling rate is dictated by considerations of the parameters of the processed signal, the highest effective sampling rate is governed by consideration of the ability of clocking circuits to drive the capacitance load of the charge transfer device. Illustratively for a typical 621 element charge transfer device having a 2 mil. channel the capacitance load is about 270 picofarads which effectively limits the highest sampling rate to approximately 20 MHz within reasonable power dissipation limits.

It will be appreciated that the delay swings provided by a charge transfer delay line of the aforementioned illustrative type can be defined between a minimum delay of 31 Nsec. and a maximum delay of 56.4 $\mu$sec, derived by dividing the number of elements (621) by the highest sampling rate (20 MHz) and the lowest sampling rate (10.74 MHz) respectively. The delay range of 25.4 $\mu$sec. provided by such a system (i.e., the difference between maximum delay and minimum delay) falls short of the aforesaid range (in excess of 63.5 μsec.) needed for effective picture "jitter" correction when video signals are recovered from a video disc.

While a charge transfer delay line having a larger number of elements might theoretically provide the needed delay range, the additional load capacity presented by such a device effectively reduces the upper clock frequency at which the device may be operated. Moreover, since the efficiency (i.e., amplitude vs. frequency) of a charge transfer device is inversely related to the number of elements comprising such device, increase in the number of elements adversely affects such device efficiency. Additional considerations include practical limitations on device size and commercial availability.

In accordance with the principles of the present invention, the aforesaid large delay swings are advantageously realized in a 621 element charge transfer delay line when used in conjunction with a record player embodying a color encoding format, described in U.S. Pat. No. 3,872,498 — Pritchard. That format comprises a chrominance signal component in the form of a modulated subcarrier component of 1.53 MHz interleaved in the midband of a wider bank luminance signal component arranged to cover a bandwidth of 0 to 3 MHz. The design and operation of the charge transfer device with such a system is greatly simplified since the Nyquist rules are satisfied by operating the clock frequency at lower values (e.g., 6 MHz). Therefore, the value of the maximum delay can be effectively raised to 103 μsec. (The aforesaid 621 elements divided by 6 MHz), thereby providing a delay line range in excess of 1H, or approximately 72 μsec.

In further accordance with the principles of the present invention, the time base stabilization of signals recovered from a disc record is advantageously realized in a video disc record player system by means of charge transfer devices which are operated in a manner enabling the large corrections required (in excess of the time duration of a horizontal video line in the NTSC format) for effective time base stabilization.

The large delay swings, between a minimum time delay and a maximum time delay, which a charge coupled device need provide for effecting successful time base stabilization of the output of a video disc record player require that a voltage controlled oscillator providing an output controlling that delay line be capable of large changes in output frequencies (e.g., on the order of 50% variations) corresponding to the delay swings needed. However, operating difficulties due to the aforesaid large changes in oscillator output frequencies, manifest themselves in the absence of a linear relationship between the delay to which the video signals are subjected and the detected relative velocity error.

In accordance with one aspect of the present invention, compensation for the above described absence of a linear relationship is effected by means of a clock signal generator which is a "period" oscillator relative to the relative velocity error signal. In accordance with a preferred embodiment of the present invention, a feedback loop for a voltage controlled oscillator affects oscillator operation in a manner causing the period of the oscillator output to correspond to the oscillator control voltage. By providing compensation for the inverse frequency relationship between the output and the input of the oscillator, this feedback loop "linearizes" the output of the oscillator with respect to the detected relative velocity error.

The accompanying drawing illustrates, partially schematically and partially by block diagram representation, video disc playback apparatus incorporating signal time base stabilization circuitry in accordance with an illustrative embodiment of the present invention.

In the FIGURE, a record disc 11, illustratively of the aforementioned Clemens type, is shown supported on a turntable 13 mounted for rotation on a base 15. A pickup arm 17 is positioned so that a stylus 19, supported at one end of the arm 17, is riding in a groove of the disc record 11. As the turntable rotates, the stylus 19 rides in the groove passing over successive dimension varying information track elements formed in the groove bottom, which serve to vary the capacitance presented between a conductive electrode incorporated in the stylus tip and conductive layer coating the disc surface and which is overlaid with a dielectric layer. This variation in capacitance, in turn, varies the resonant frequency of the tuned circuit of detector 21 which includes the inductance of inductor 23, the junction capacitance of diode 25 and the stray capacitance of the circuit. Radio frequency energy is injected into the tuned circuit by means of an RF oscillator 27. As the resonant frequency of the tuned circuit varies in accordance with the recorded signals, the response of the tuned circuit to the fixed frequency RF signal from oscillator 27 varies and the peak detector circuit comprising diode 25, capacitor 31 and resistor 29 detects the resultant amplitude variations which are representative of the recorded information. Signal information recovered from the video disc, illustratively in an encoded format of a type described in the aforementioned Pritchard patent, is coupled to a demodulator circuit 33 through an amplifier 35, wherein the recovered information is demodulated to provide an amplitude modulated signal containing the recorded video signal information.

Processed signal information provided at the output of circuit 33 is coupled to a delay line 37 which is a baseband, two phase, delay-controllable analog delay line. This delay line may be a charge transfer device employing, for example, the bucket brigade or charge coupled technique and comprising 621 elements. A low pass filter 39 passes the low frequency portion of the signals provided at the output of delay line 37, through an amplifier 41, to signal processing circuitry 42 which generally include means for transcoding the signal information into an appropriate format, such as NTSC standard, for effective image reproduction.

The output of amplifier 41 is also applied to sync separator 43, comprised within a delay line control loop, which operates in of a to detect horizontal synchronization pulses occurring from the signal information.

The detected sync pulses from separator 43 are applied to one input of a phase comparator 45. The other input for phase comparator 45 is provided by a voltage controlled oscillator 47 having a nominal output frequency corresponding to the horizontal sync frequency (15.734 KHz). Phase comparator 45 compares the phase of the output of oscillator 47 with the phase of the output of sync separator 43 and provides a resultant error signal which is applied to a sample and hold stage 49, employed to convert the error signal which appear as relatively narrow pulses into sinusoidal signals which follow the detected error signal with an amplitude that varies symmetrically about the center frequency and provide the circuit with a relatively broad response curve. The output of the sample and hold stage 49 is applied to a low pass filter 51 to detect long-term variations in the output thereof. The output of the low pass filter 51 is in turn used to control the output frequency of the oscillator 47 to cause it to jitter in a corresponding manner to the signal provided at the output of phase comparator 45. Low pass filter 51 determines the high frequency cutoff point of the response of the system to detected sync pulses frequency variations which in the embodiment shown is 100 Hz. The output of the sample and hold circuit 49 is representative of a departure of the relative velocity between the stylus 19 and the groove of the record 11 from a predetermined value. This output is applied to integrator circuit 53, via capacitor 52, so as to derive a position error signal representative of the degree of compression or stretching of the recovered signal information.

The output of integrator circuit 53 is applied to one input of a differential amplifier (comparator) 54 having a second order filter 55 coupling that input and the output of the amplifier 54 for purposes of gain stabilization and control of the time constant of the delay line control loop. The output of comparator 54 is applied, via a low pass filter 56, to a voltage controlled oscillator 57 to cause the output frequency thereof to jitter in an opposing manner to the jitter associated with the signal provided from video disc 11. It will be appreciated that in accordance with the selected parameters of the illustrative embodiment, the output of voltage controlled oscillator 57 need vary between a low frequency of 6 MHz and a high frequency of 20 MHz. It will be further appreciated that oscillator operation over such large variations in output results in an output frequency which is non-linear with respect to the controlling voltage (i.e., the output of integrator 53) and which non-linearity is particularly pronounced over the higher range of output frequencies. Compensation for the non-linear relationship existing between the output frequency of oscillator 57 and the controlling voltage is provided for by means of a feedback loop which couples the output of oscillator 57 to an additional input of differential amplifier 55.

Since the output of oscillator 57 varies over a wide range of frequencies (e.g., the aforesaid 6 to 20 MHz range), the feedback loop includes a frequency reduction stage 59 (e.g., a divider of 16 times) which effects a reduction in the output frequency of oscillator 57 to simplify the choice of operating parameters of the remaining elements of the feedback loop. Additionally, reduction stage 59 operatively assures the symmetry of the square wave output of oscillator 57 at high frequency output values. This output of reduction stage 59 controls the operation of an "open-collector" logic device 61 which alternatively shunts a capacitor 63 to ground and removes the capacitor 63 from ground shunt in consonance with the period of the output of reduction stage 59. During those intervals where capacitor 63 is removed from ground shunt the capacitor is charged with a constant current which flows through the emitter of a transistor 65 biased for operation as a constant current source. When the capacitor 63 is again shunted to ground, the charge level reached will be a direct function of charge time and thus a direct function of the period of the output of reduction stage 59. This charge level is applied through a transistor 67 comprised within an emitter follower stage to a second order integrator stage 69. The output of integrator stage 69, which is a d.c. level corresponding to the period of the output of oscillator 57, is applied to the additional input of comparator 55.

It will be appreciated that in the operation of the linearizing feedback loop, the loop gain desirably reduces the difference between the respective inputs to the comparator 54 to a zero value. Therefore, the period of the output of oscillator 57 effectively becomes a linear function of the input relative velocity error. Where the period of the output of oscillator 57 deviates from that linear relationship, the output of integrator stage 69 is concomitantly altered to drive oscillator 57 in a direction which restores the linear relationship between the period of the output thereof and the relative velocity error input.

The output of oscillator 57 is coupled to clock driver 67 wherein two antiphase clock signals are produced for driving, for example, a bucket brigade or charge-coupled type of delay line such as delay line 37. The clock signals effect a varying of the delay imparted by the delay line concomitantly with the detected spurious variations of the frequency of the horizontal synchronization component, in a sense establishing a direct relationship between those frequency variations and the concomitant delay variations.

It is noted that the horizontal sync pulses which are recorded on the video disc serve as a convenient frequency reference from which to develop a control signal which is used to correct velocity errors. Other systems, however, could employ a separate recorded frequency for accomplishing the same purpose.

What is claimed is:

1. Apparatus for use with a source of composite video signals comprising a succession of video lines and including a synchronization component, said composite video signal being subject to spurious frequency variations, said apparatus comprising:

controllable delay means coupled to said source of signals for imparting a controllable amount of delay to said composite video signal; said controllable delay means comprising a clock-controlled charge transfer device having an analog signal input terminal coupled to said source of signals, an analog signal output terminal, and clock signal input terminals; and means, responsive to spurious variations of the frequency of said synchronization component of said composite video signal, for supplying to said clock signal input terminals variable frequency clock signals which vary the delay imparted by said delay means in a manner establishing a substantially linear, inverse relationship between said frequency variations and variations in the frequency of said clock signals;

said supplying means including:

a voltage controlled oscillator for developing said variable frequency clock signals in response to spurious variations in the frequency of said synchronization component; and means, responsive to the output of said oscillator for effecting an alteration of the period of the clock signal output of said supplying means in a manner causing the establishment of a substantially linear relationship between said spurious frequency variations and the period alterations of the clock signals.

2. Apparatus according to claim 1 wherein said supplying means further comprises:

means for detecting spurious variations in the frequency of said synchronization component;

means for generating the integral of the output signal of said detecting means; and means for providing said integral output signal to said voltage controlled oscillator.

3. In a disc record player comprising pickup apparatus for developing upon playback of a color picture disc record a succession of lines of composite color video signals, including a luminance component occupying a given frequency band, a chrominance component interleaved with said luminance component over only an intermediate portion of said given band and synchronization component, said composite color video signal components being concomitantly subject to spurious frequency variations in the course of playback; apparatus for processing the composite color video signals comprising:

controllable delay means, receptive of said composite color video signals recovered during playback, for imparting a controllable amount of delay to said composite video signal; said controllable delay means comprising a clock controlled charge transfer device having an analog signal input terminal coupled to said source of signals, an analog signal output terminal and clock signal input terminals; and means coupled to said output terminal, for supplying clock signals with a frequency subject to variation in opposition with the sense of said spurious frequency variations of said synchronization component, to said clock signal input terminals to control the delay time of said charge transfer device;

said supply means including:

a voltage controlled oscillator for developing said clock signals in response to spurious variations in the frequency of said synchronization component; and means responsive to the output of said oscillator for effecting an alteration of the period of the clock signal output of said supplying means in a manner causing the establishment of a substantially linear relationship between said spurious frequency variations and the period alterations of the clock signals.

4. Apparatus in accordance with claim 3 wherein said clock signals supplying means further comprises:

means, receptive of the output of said delay means, for providing a signal which is representative of the spurious frequency variations of said synchronization component; and means for integrating the output of said providing means.

5. Apparatus according to claim 2 wherein said providing means comprises a comparator means having a first input terminal connected to said generating means and a second input terminal connected to said effecting means and an output terminal connected to said voltage controlled oscillator.

6. Apparatus according to claim 4 further comprising a comparator means having a first input terminal connected to said integrating means and a second input terminal connected to said effecting means and an output terminal connected to said voltage controlled oscillator.

7. Apparatus for use with a source of composite video signals, said composite video signal being subject to spurious frequency variations, said apparatus comprising:

controllable delay means coupled to said source of signals for imparting a controllable amount of delay to said composite video signal; said controllable delay means having an analog signal input terminal coupled to said source of signals, an analog signal output terminal, and at least one clock signal input terminal;

means, responsive to spurious variations of the frequency of a component of said composite video signal, for supplying to said at least one clock signal input terminal a variable frequency clock signal which varies the delay imparted by said delay means; and means responsive to said clock signal for effecting an alteration of the period of the clock signal output of said supplying means in a manner causing the establishment of a substantially linear relationship between said spurious frequency variations and the period alterations of the clock signals.

8. Apparatus according to claim 7 wherein said supplying means further comprises:

means for detecting spurious variations in the frequency of said component; and a voltage controlled oscillator means responsive to said detecting means for developing said variable frequency clock signal.

9. Apparatus according to claim 8 further comprising a signal integration means connected between said detecting means and said voltage controlled oscillator.

10. Apparatus according to claim 9 further comprising comparator means having a first input terminal connected to said signal integration means and a second input terminal connected to said effecting means and an output terminal connected to said oscillator means.

* * * * *